United States Patent
Sasaki et al.

(10) Patent No.: US 6,901,185 B2
(45) Date of Patent: May 31, 2005

(54) OPTICAL MODULE CAPABLE OF IMPROVING COUPLING EFFICIENCY AND SUPPRESSING FLUCTUATION OF COUPLING LOSS AND ITS MANUFACTURING METHOD

(75) Inventors: Junichi Sasaki, Tokyo (JP); Kazuhiko Kurata, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 175 days.

(21) Appl. No.: 10/342,181

(22) Filed: Jan. 15, 2003

(65) Prior Publication Data

US 2003/0138223 A1 Jul. 24, 2003

(30) Foreign Application Priority Data

Jan. 15, 2002 (JP) ........................................ 2002-005873

(51) Int. Cl.[7] .................................................. G02B 6/32
(52) U.S. Cl. ............................ 385/33; 385/93; 385/137
(58) Field of Search ........................ 385/31, 33, 88–94, 385/137

(56) References Cited

U.S. PATENT DOCUMENTS

| | | | | |
|---|---|---|---|---|
| 4,897,711 A | * | 1/1990 | Blonder et al. | 257/48 |
| 5,071,213 A | * | 12/1991 | Chan | 385/52 |
| 5,073,003 A | * | 12/1991 | Clark | 385/33 |
| 5,123,073 A | * | 6/1992 | Pimpinella | 385/59 |
| 5,125,057 A | * | 6/1992 | Aberson et al. | 385/65 |
| 5,357,103 A | * | 10/1994 | Sasaki | 250/227.24 |
| 5,479,540 A | * | 12/1995 | Boudreau et al. | 385/14 |
| 5,577,142 A | * | 11/1996 | Mueller-Fiedler et al. | 385/47 |
| 5,600,741 A | * | 2/1997 | Hauer et al. | 385/35 |
| 5,764,832 A | * | 6/1998 | Tabuchi | 385/49 |
| 5,911,022 A | * | 6/1999 | Plickert et al. | 385/49 |
| 6,132,107 A | * | 10/2000 | Morikawa | 385/89 |
| 6,406,196 B1 | * | 6/2002 | Uno et al. | 385/89 |

FOREIGN PATENT DOCUMENTS

| | | |
|---|---|---|
| JP | A 4-308804 | 10/1992 |
| JP | 06-151903 | 5/1994 |
| JP | A 10-115732 | 5/1998 |
| JP | 10-126002 | 5/1998 |
| JP | 2000-292658 | 10/2000 |
| JP | 2001-116962 | 4/2001 |
| JP | 2001-133667 | 5/2001 |

* cited by examiner

Primary Examiner—Ellen E. Kim
(74) Attorney, Agent, or Firm—Young & Thompson

(57) ABSTRACT

In an optical module, a package includes an array of first optical elements and at least one first positioning member. A microlens array plate including microlenses is fixed to the package, so that each of the microlenses corresponds to one of the first optical elements. An optical array connector mounts second optical elements thereon. The optical array connector has a light path bending portion for bending light paths of the second optical elements and at least one second positioning member. The optical array connector abuts against the package by aligning the second positioning member to the first positioning member so that each of the first optical elements corresponds to one of the second optical elements, A clamping member clamps the optical, array connector to the package.

29 Claims, 11 Drawing Sheets

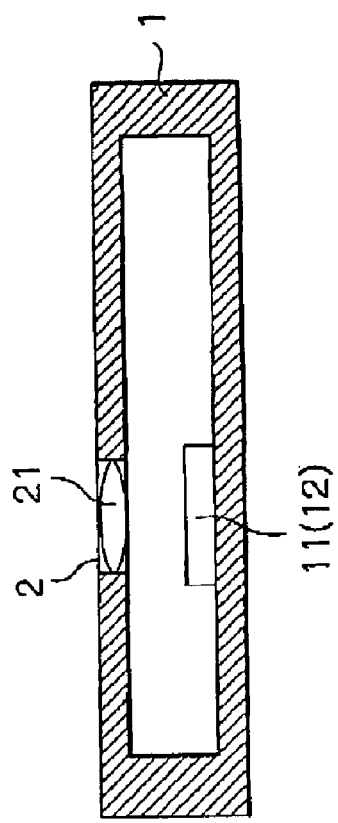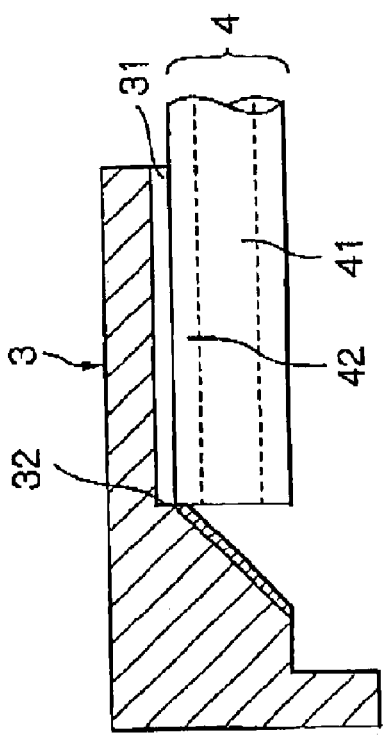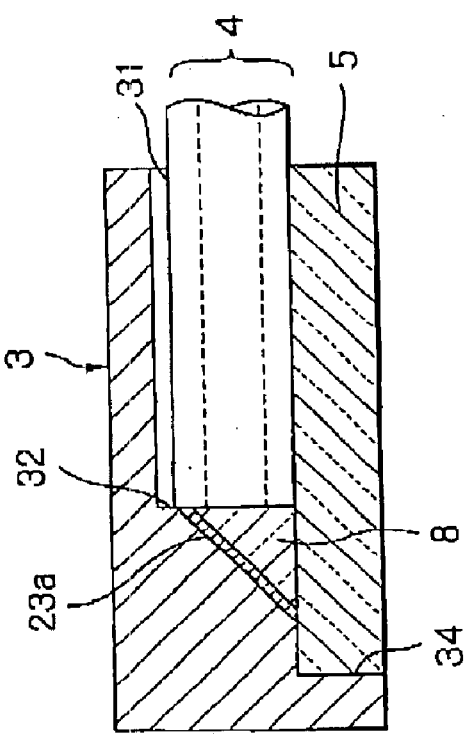

OPTICAL MODULE CAPABLE OF IMPROVING COUPLING EFFICIENCY AND SUPPRESSING FLUCTUATION OF COUPLING LOSS AND ITS MANUFACTURING METHOD

BACKGROUND OF THE INVENTION

1. Field of the Invention

The present invention relates to an optical module formed by a package for receiving and emitting light and an optical connector, and more particularly, to the improvement of a coupling structure between the package and the optical connector and its manufacturing method.

2. Description of the Related Art

Optical interconnection of the LSI packages with each other by optical fibers or optical waveguides is attractive in order to enhance thee operation speed in a computer system where large scale integrated circuit (LSI) packages such as a central processing unit (CPU) and memories are mounted on a board.

Connecting the LSI packages with each other by using optical interconnection modules is one of possible way to establish inter-LSI package optical interconnection. In this configuration, however, the redundant portions of the optical fibers would need to be processed. Because the most of optical interconnection module have pig-tailed optical fibers of normalized length and these fibers are not detachable from the module. To avoid the optical fiber occupation on the board, it is preferable that the optical fibers are removable from the optical module. By this, optical modules are connected each other by optical fibers of preferable lengths.

Optical modules without pig-tailed optical fibers have been suggested. That is, optical fibers are removable from LSI packages, In this case, if the optical fibers are moved in the horizontal direction to couple with the LSI packages, dead space due to the horizontal motion of the optical fibers may be created on a board, so that the mounting density of LSI packages on the board is decreased. Therefore, it is preferable that the optical fibers be moved in the vertical direction to couple with the LSI packages.

In a first prior art optical module (see: JP-A-4-308804), an array of optical fibers adhered to a microlens array is moved down to couple with an LSI package, so that the above-mentioned dead space on a board is decreased to increase the mounting density of LSI packages on the board. This will be explained later in details In the above-described first prior art optical module, however, if the alignment of the optical fibers to the LSI package fluctuates, the coupling efficiency therebetween deteriorates.

In a second prior art optical module (see: JP-A-10-115732), an optical fiber with a mirror and a half mirror is moved down to couple with a package. This also will be explained later in detail.

In the above-described second prior art optical module, however, since the mirror and the half mirror are protruded from the bottom surface of the optical fiber, the coupling between the optical fiber and the package is carried out by a transparent adhesive layer, so that it is impossible to remove the optical fiber from the package. Thus, the optical fiber is not removable. If the optical fiber is forcibly removed from the package and is again fixed to the package or another package, the coupling loss fluctuates.

SUMMARY OF THE INVENTION

It is an object of the present invention to provide an optical module capable of improving the coupling efficiency and suppressing the fluctuation of the coupling loss.

Another object is to provide a method for manufacturing such an optical module.

According to the present invention, in an optical module, a package includes an array of first optical elements and at least one first positioning member. A microlens array plate including microlenses is fixed to the package, so that each of the microlenses corresponds to one of the first optical elements. An optical array connector mounts second optical elements thereon. The optical array connector has a light path bending portion for bending light paths of the second optical elements and at least one second positioning member. The optical array connector abuts against the package by aligning the second positioning member to the first positioning member so that each of the first optical elements corresponds to one of the second optical elements. A clamping member clamps the optical array connector to the package.

BRIEF DESCRIPTION OF THE DRAWINGS

The present invention will be more clearly understood from the description set forth below, as compared with the prior art, with reference to the accompanying drawings, wherein:

FIGS. 6A, 6B, 6C and 6D are cross-sectional views for explaining an assembling operation of the optical nodule of FIG. 4;

DESCRIPTION OF THE PREFERRED EMBODIMENTS

Before the description of the preferred embodiments, prior art optical modules will be explained with reference to FIGS. 1, 2 and 3.

Figure 1:
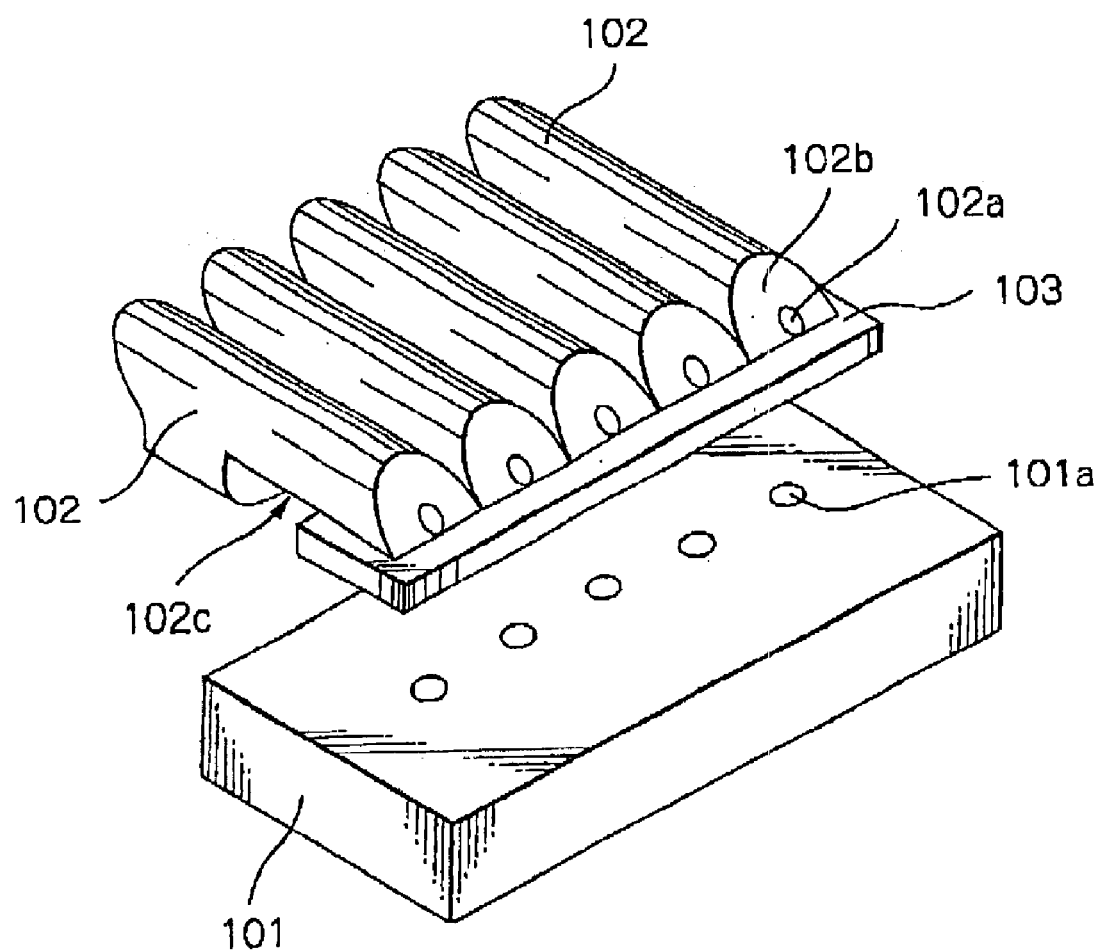
FIG. 1 is an exploded, perspective view illustrating a first prior art optical module.

In FIG. 1, which illustrates a first prior art optical module (see: JP-A-4-308804), an LSI package 101 includes LSI chips (not shown) and optical elements 101$a$ such as surface-emitting laser diodes and surface-receiving PIN photodiodes electrically connected to the LSI chips. Also, an array of optical fibers 102 are provided to correspond to the optical elements 101$a$. In this case, each of the optical fibers 102 is constructed by a core layer 102$a$ and a clad layer 102$b$ surrounding the core layer 102$a$. The facets of the optical fibers 102 are oblique, i.e., at 45° to the optical axes thereof, and a plane portion 102$c$ is formed at the clad layer 102$b$ of each of the optical fibers 102. Further, a microlens array 103 is provided.

After a surface of the microlens array 103 is adhered to the plane portions 102c of the optical fibers 102, the optical fibers 102 are moved down so that the other surface of the microlens array 103 is adhered to the LSI package 101.

Figure 2:
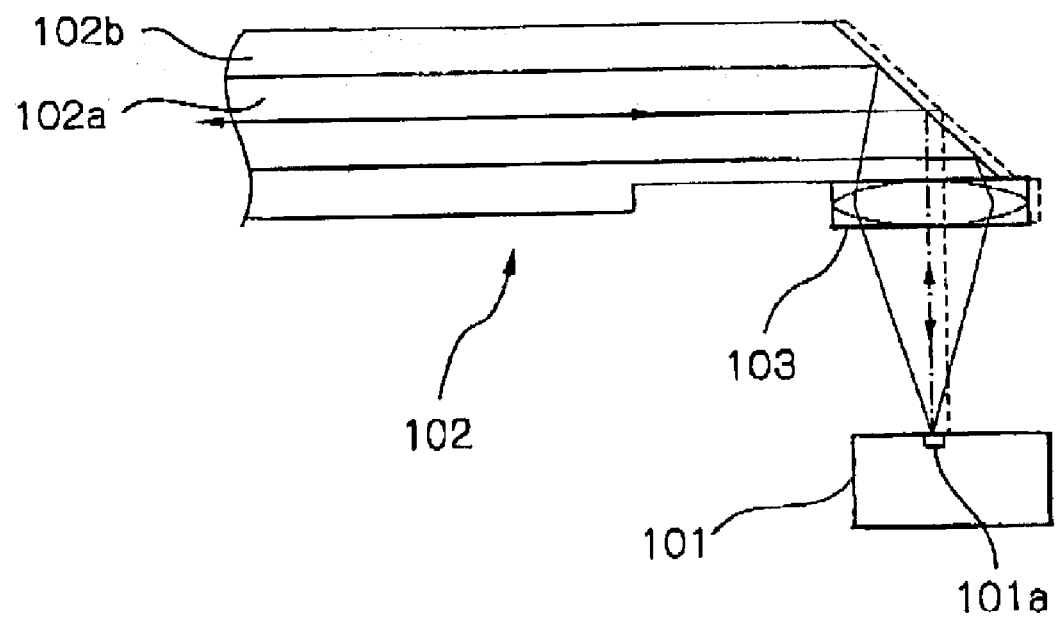
FIG. 2 is a view of an assembled state of the optical module of FIG. 1.

Thus, as illustrated in FIG. 2, light emitted from of the optical elements 101a is transmitted through the microlens array 103 and is reflected by the facet of one of the optical fibers 102 to pass through the core layer 102a thereof. On the other hand, light emitted from the core layer 102a of one of the optical fibers 102 is reflected by the facet of one of the optical fibers 102 and is transmitted through the microlens array 103 to reach a respective one of the optical elements 101a.

If the array of the optical fibers 102 adhered to the microlens array 103 are removable from the LSI package 101, the alignment of the optical fibers 102 to the LSI package 101 must be accurate. For example, if the diameter of the optical element 110a is less than 30 μm, the error of the alignment of the optical fibers 102 to the LSI package 101 must be less than 5 μm. Therefore, if the alignment of the optical fibers 102 to the LSI package 101 fluctuates as indicated by dotted lines in FIG. 2, the coupling efficiency thereof deteriorates.

Figure 3:
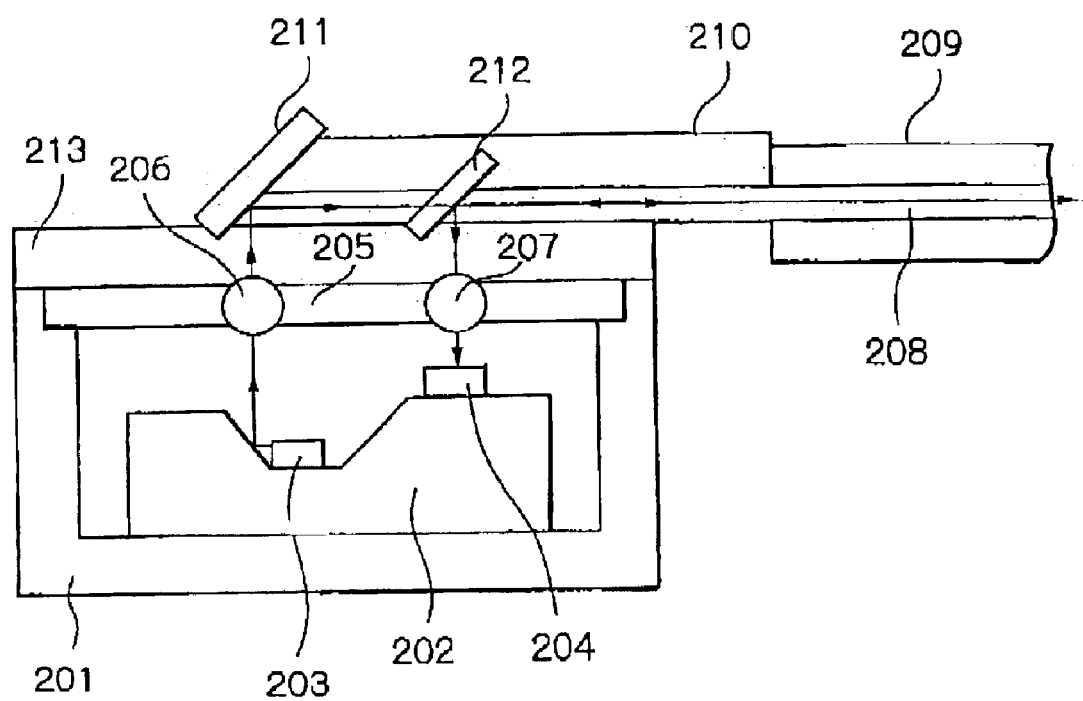
FIG. 3 is a diagram illustrating a second prior art optical module.

In FIG. 3, which illustrates a second prior art optical module (see: JP-A-10-115732), a silicon substrate 202 is adhered to a package 201, and a surface-emitting laser diode 203 and a surface-receiving PIN photodiode 204 are adhered to the silicon substrate 202. Also, a ceramic plate 205 for fixing microlenses 206 and 207 is placed on the package 201.

Also, an optical fiber 208 supported by a precision capillary 209 is buried in a groove of a fiber burying substrate 210 which has an oblique end face for mounting a mirror 211 and a groove for mounting a half mirror 212.

The fiber burying substrate 210 having the optical fiber 208, the mirror 211 and the half mirror 212 is moved down, so that the fiber burying substrate 210 is fixed by a transparent adhesive layer 213 to the ceramic plate 205.

Thus, light emitted from the laser diode 203 is transmitted through the microlens 206 and is reflected by the mirror 211 to pass through the half mirror 212. On the other hand, light from the optical fiber 208 is reflected by the half mirror 212 and is transmitted through the microlens 207 to reach the PIN photodiode 204.

In the optical module of FIG. 3, however, since the mirror 211 and the half mirror 212 are protruded from the bottom surface of the optical fiber 208 buried in the fiber burying substrate 210, use is made of the transparent adhesive layer 213 in order to fix the optical fiber 208 to the package 201, i.e., the ceramic plate 205 with the microlenses 206 and 207, which would make it impossible for the optical fiber 208 to remove from the package 201. Thus, the optical fiber 208 is not removable. If the optical fiber 208 is forcibly removed from the package 201 and the optical fiber 208 is again fixed to the package 201 or another package, the coupling loss fluctuates.

Figure 4:
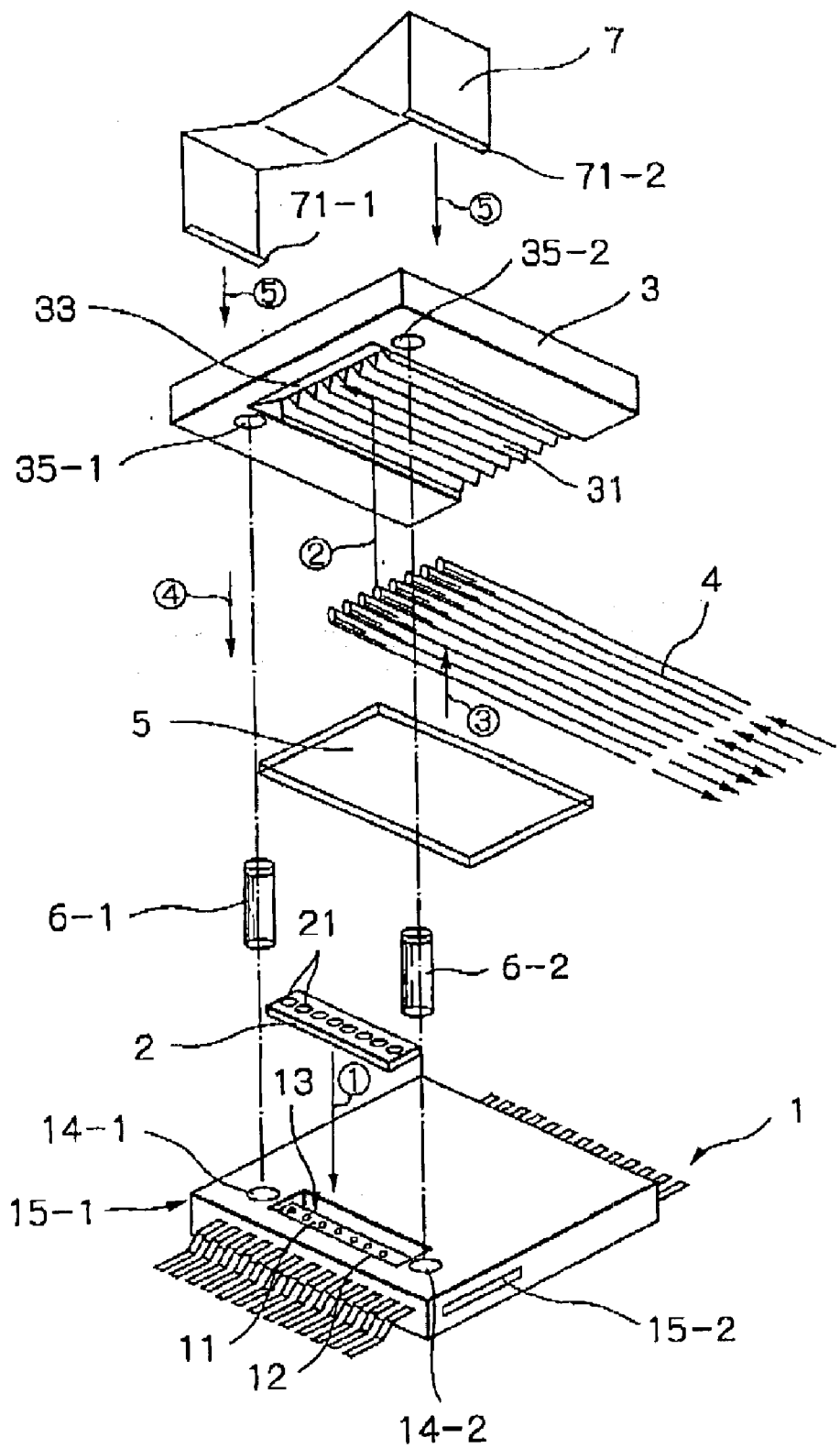
FIG. 4 is an exploded, perspective view illustrating a first embodiment of the optical module according to the present invention.

In FIG. 4, which illustrates a first embodiment of the optical module according to the present invention, an LSI package 1 includes LSI chips (not shown), and surface-emitting laser diodes 11 and surface-receiving PIN photodiodes 12 electrically connected to the LSI chips. For example, the pitch of the laser diodes 11 and the pitch of the PIN photodiodes 12 are 250 μm. The laser diodes 11 and the PIN photodiodes 12 are exposed by a rectangular opening 13 on the upper side of the LSI package 1. Also, guide recesses 14-1 and 14-2 are perforated on the upper side of the LSI package 1. Further, recesses 15-1 and 15-2 are perforated on the sides of the LSI package 1.

A microlens array plate 2 includes microlenses 21 corresponding to the laser diodes 12 and the PIN photodiodes 13. In this case, the microlens array plate 2 can be fitted into the rectangular opening 13 of the LSI package 1, and the pitch of the microlenses 21 is 250 μm, for example.

Figure 5:
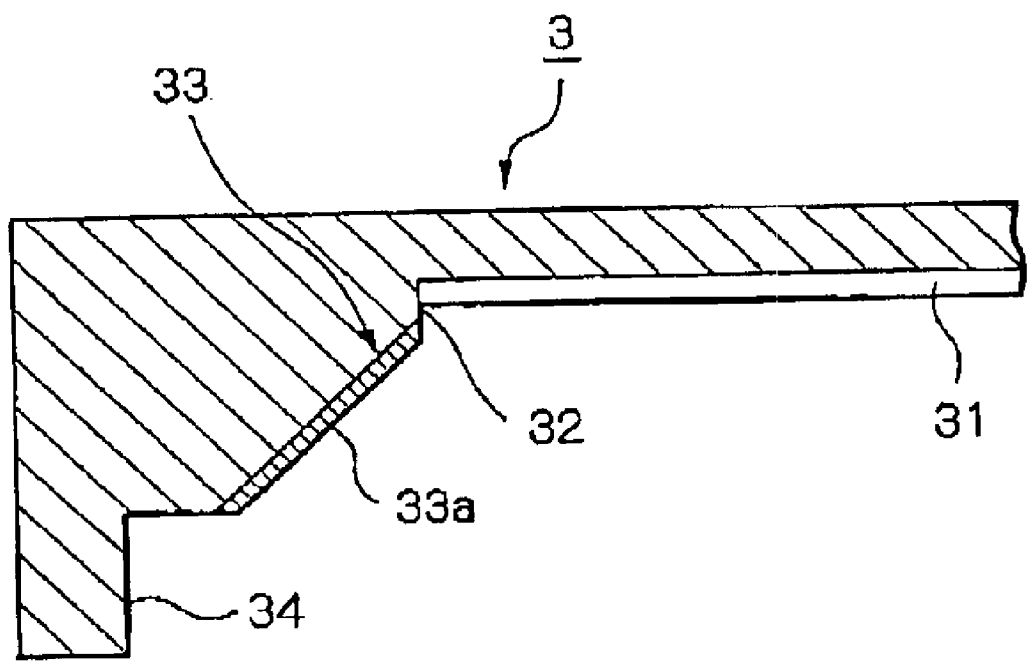
FIG. 5 is a cross-sectional view of the fiber array connector of FIG. 4.

An optical array connector, i.e., a fiber array connector 3 has V-shaped grooves 31 on its bottom side for receiving optical fibers 4. Also, as illustrated in FIG. 5, a vertical stopper face 32 for stopping the optical fibers 4 and an oblique face 33 having an approximate angle of 45°, and a vertical stopper face 34 for stopping a glass plate 5 are provided in the fiber array connector 3. Note that a mirror 33a made of an Au layer is deposited by an evaporation process on the oblique face 33. Also, guide recesses 35-1 and 35-2 corresponding to the guide recesses 14-1 and 14-2 of the LSI package 1 are perforated on the bottom side of the fiber array connector 3.

Guide pins 6-1 and 6-2 are used for aligning the fiber array connector 3 to the LSI package 1.

A clamping member 7 is used for clamping (fixing) the fiber array connector 3 to the LSI package 1. The clamping member 7 is made of adiabatic material and has two nails 71-1 and 71-2 corresponding to the recesses 15-1 and 15-2 of the LSI package 1.

The assembling operation of the optical module of FIG. 4 is explained below.

First, as indicated by ①, the microlens array plate 2 is fitted into the opening 13 of the LSI package 1, so that the optical axes of the microlenses 21 are in alignment with these of the laser diodes 11 and the PIN diodes 12, as illustrated in FIG. 6A.

Next, as indicated by ②, the optical fibers 4 are fitted into the V-shaped grooves 31 of the fiber array connector 3, so that the facet of the optical fibers 4 abuts against the vertical stopper face 32 of the fiber array connector 3, as illustrated in FIG. 6B. In FIG. 6B, note that each of the optical fibers 4 is constructed by a core layer 41 and a clad layer 42.

Next, as indicated-by ③, the glass plate 5 is adhered to the optical fibers 4 after a transparent resin layer 8 is fitted into a spacing between the optical fibers 4 and the mirror 33a, as illustrated in FIG. 6C. In this case, the glass plate 5 abuts against the vertical stopper face 34 of the fiber array connector 3. As a result, the optical fibers 4 are securely fitted into the V-shaped grooves 31 of the fiber array connector 3. Note that the transparent resin layer 8 is made of ultraviolet thermosetting adhesives. Therefore, when such adhesives are coated on the upper and lower faces of the optical fibers 4, the glass plate 5 is surely adhered to the optical fibers 4. Also, the transparent resin layer 8 serves as a refractive index matching element between the LSI package 1 and the optical fibers 4, to suppress the spread of light reflected from the mirror 33a, light from the optical fibers 4 and light to the optical fibers 4.

Next, as indicated by ④, the fiber array connector 3 with the optical fibers 4 and the glass plate 5 is moved down while the guide pin 6-1 is fitted into the guide recesses 14-1 and 35-1 and the guide pin 6-2 is fitted into the guide recesses 14-2 and 35-2. Thus, the optical fibers 4 are surely in alignment with the laser diodes 11 and the PIN photodiodes 12.

Finally, as indicated by ⑤, the clamping member 7 clamps the fiber array connector 3 to the LSI package 1 by inserting the nails 71-1 and 71-2 into the recesses 15-1 and 15-2 of the LSI package 1. As a result, the fiber array connector 3 couples with the LSI package 1, as illustrated in FIG. 6D.

Figure 6D:
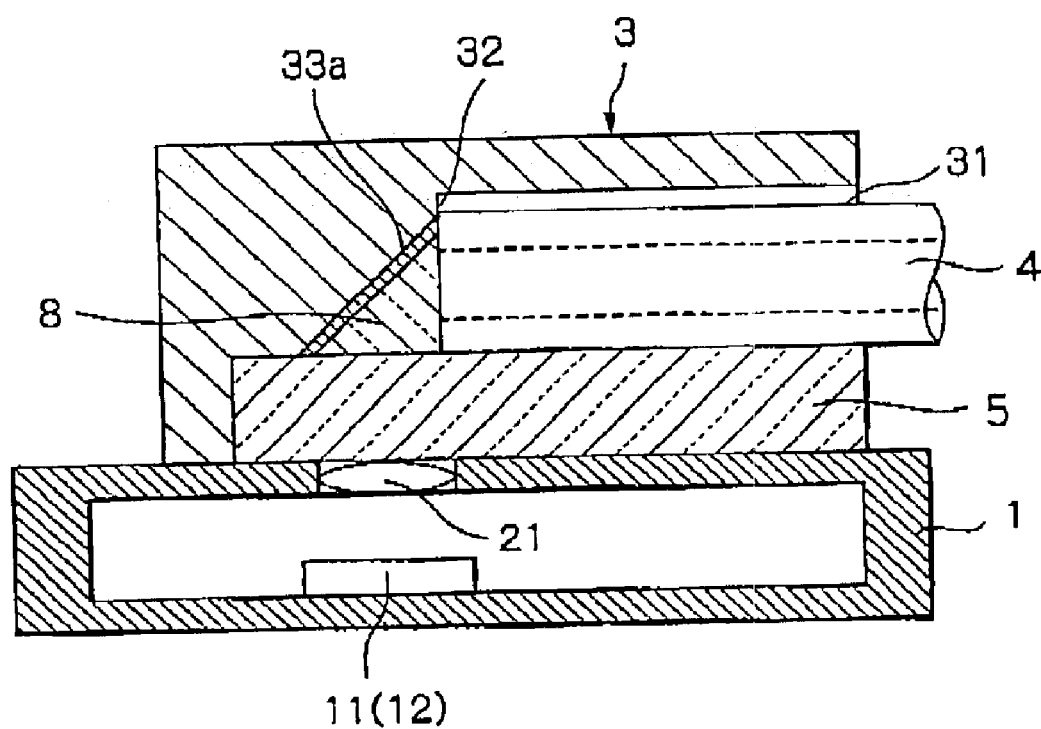

In FIG. 6D, light emitted from the laser diodes 11 is transmitted through the microlenses 21 and the glass substrate 5, and is reflected by the mirror 33a to reach the optical fibers 4. On the other hand, light emitted from the optical fibers 4 is reflected by the mirror 33a, and is transmitted through the glass plate 5 and the microlenses 21 to reach the PIN diodes 12.

The disassembling operation of the assembled optical module of FIG. 5 is carried out just by removing the clamping member 7 therefrom. As a result, the fiber array connector 3 with the optical fibers 4 and the glass plate 5 can be easily separated from the LSI package 1.

Thus, in the first embodiment, since the optical fibers 4 are securely adhered to the LSI package 1, the coupling efficiency therebetween can be improved. Also, since the fiber array connector 3 with the optical fibers 4 is completely removable from the LSI package 1, the fluctuation of coupling loss can be suppressed.

Figure 7:
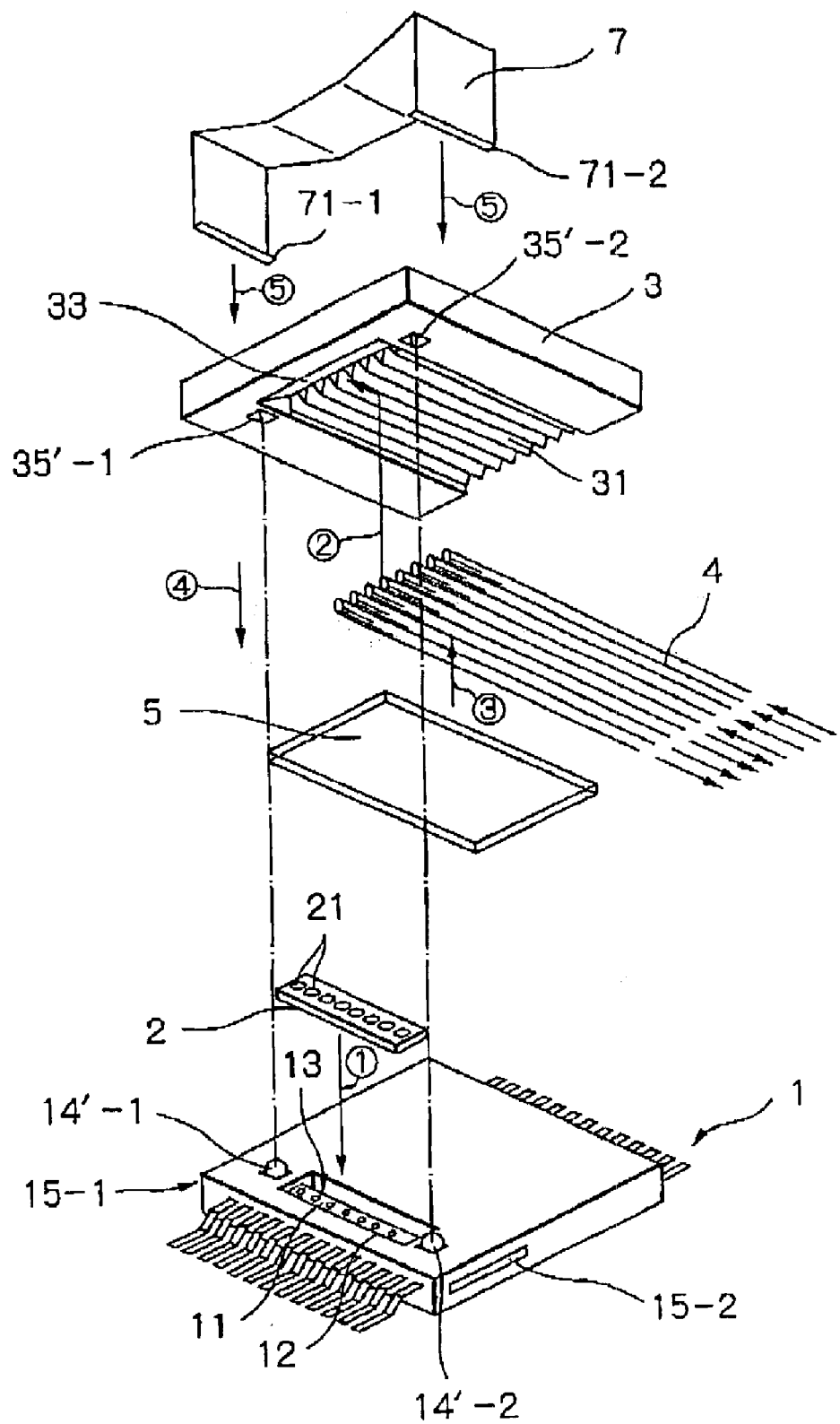
FIG. 7 is an exploded, perspective view illustrating a first modification of the optical module of FIG. 4.

In FIG. 7, which illustrates a first modification of the optical module of FIG. 4, balls 14'-1 and 14'-2 adhered to the upper face of the LSI package 1 are provided instead of the guide recesses 14-1 and 14-2 of FIG. 4, and recesses 35'-1 and 35'-2 are provided instead of the guide recesses 35-1 and 35-2 of FIG. 4. In this case, the guide pins 6-1 and 6-2 of FIG. 4 are not provided. As a result, as indicated by ④, the fiber array connector 3 with the optical fibers 4 and the glass plate 5 is moved down while the balls 14-1 and 14-2 are fitted into the recesses 35'-1 and 35'-2. Thus, the optical fibers 4 are also surely in alignment with the laser diodes 11 and the PIN photodiodes 12.

In the modification as illustrated in FIG. 7, the balls 14'-1 and 14'-2 can be provided on the lower face of the fiber array connector 3 and the recesses 35'-1 and 35'-2 can be provided on the upper face of the LSI package 1.

In FIG. 7, since the guide pins 6-1 and 6-2 of FIG. 4 are not provided, the optical module of FIG. 7 can be thinner as compared with that of FIG. 4.

Figure 8:
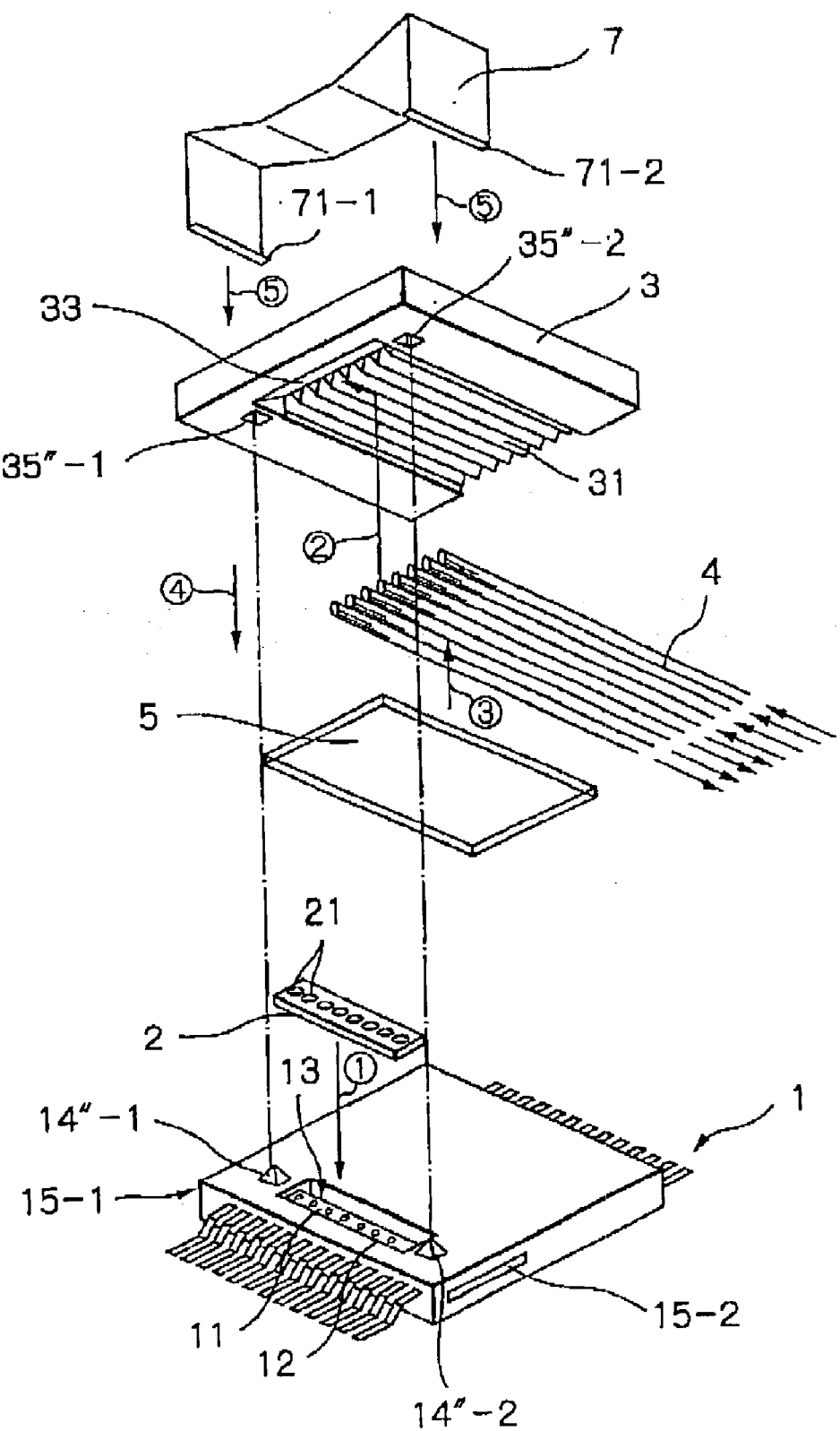
FIG. 8 is an exploded, perspective view illustrating a second modification of the optical nodule of FIG. 4.

In FIG. 8, which illustrates a second modification of the optical module of FIG. 4, pyramid-shaped protrusions 14"-1 and 14"-2 adhered to the upper face of the LSI package 1 are provided instead of the guide holes 14-1 and 14-2 of FIG. 4, and pyramid-shaped recesses 35"-1 and 35"-2 are provided instead of the guide recesses 35-1 and 35-2 of FIG. 4. In this case, the guide pins 6-1 and 6-2 of FIG. 4 are not provided. As a result, as indicated by ④, the fiber array connector 3 with the optical fibers 4 and the glass plate 5 is moved down while the protrusions 14"-1 and 14"-2 are fitted into the recesses 35"-1 and 35"-2. Thus, the optical fibers 4 are also surely in alignment with the laser diodes 11 and the PIN photodiodes 12.

In the modification as illustrated in FIG. 8, the protrusions 14"-1 and 14"-2 can be provided on the lower face of the fiber array connector 3 and the recesses 35"-1 and 35"-2 can be provided on the upper face of-the LSI package 1. However, if the fiber array connector 3 is made of monocrystalline silicon, the recesses 35"-1 and 35"-2 can be easily formed by an anisotropy etching process.

Even in FIG. 8, since the guide pins 6-1 and 6-1 of FIG. 4 are not provided, the optical module of FIG. 8 can be thinner as compared with that of FIG. 4.

Figure 9:
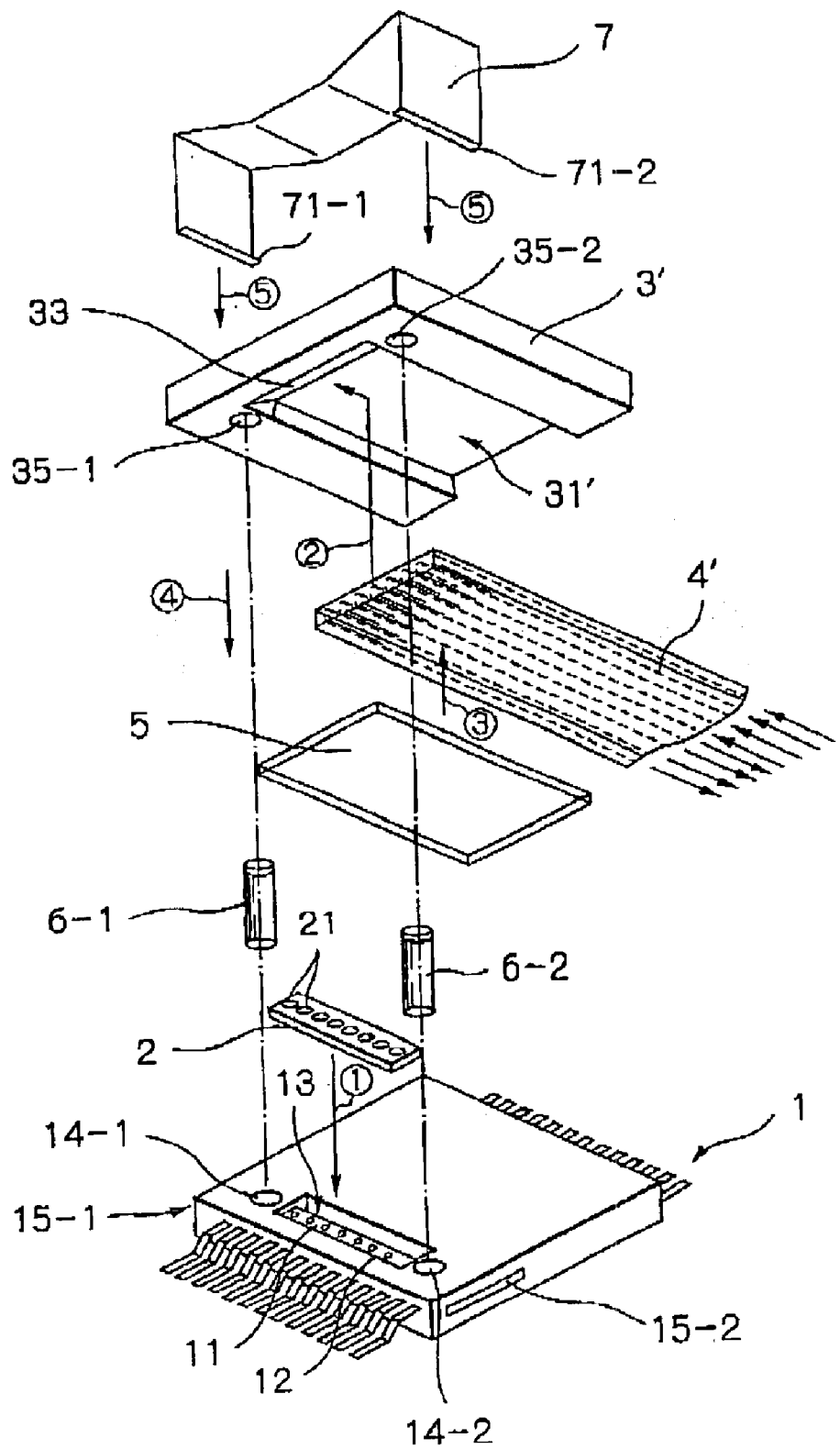
FIG. 9 is an exploded, perspective view illustrating a second embodiment of the optical module according to the present invention.

In FIG. 9, which illustrates a second embodiment of the optical nodule according to the present invention, an optical waveguide, array 4' is provided instead of the optical fibers 4 of FIG. 4, and a recess 31' is provided instead of the V-shaped grooves 31 of FIG. 4 in an optical array connector 3'. Assembling and disassembling operation of the optical module of FIG. 9 can be carried out in a similar way as in the optical module of FIG. 4. Also, the modifications of FIGS. 7 and 8 can be applied to the optical module of FIG. 9.

Figure 10:
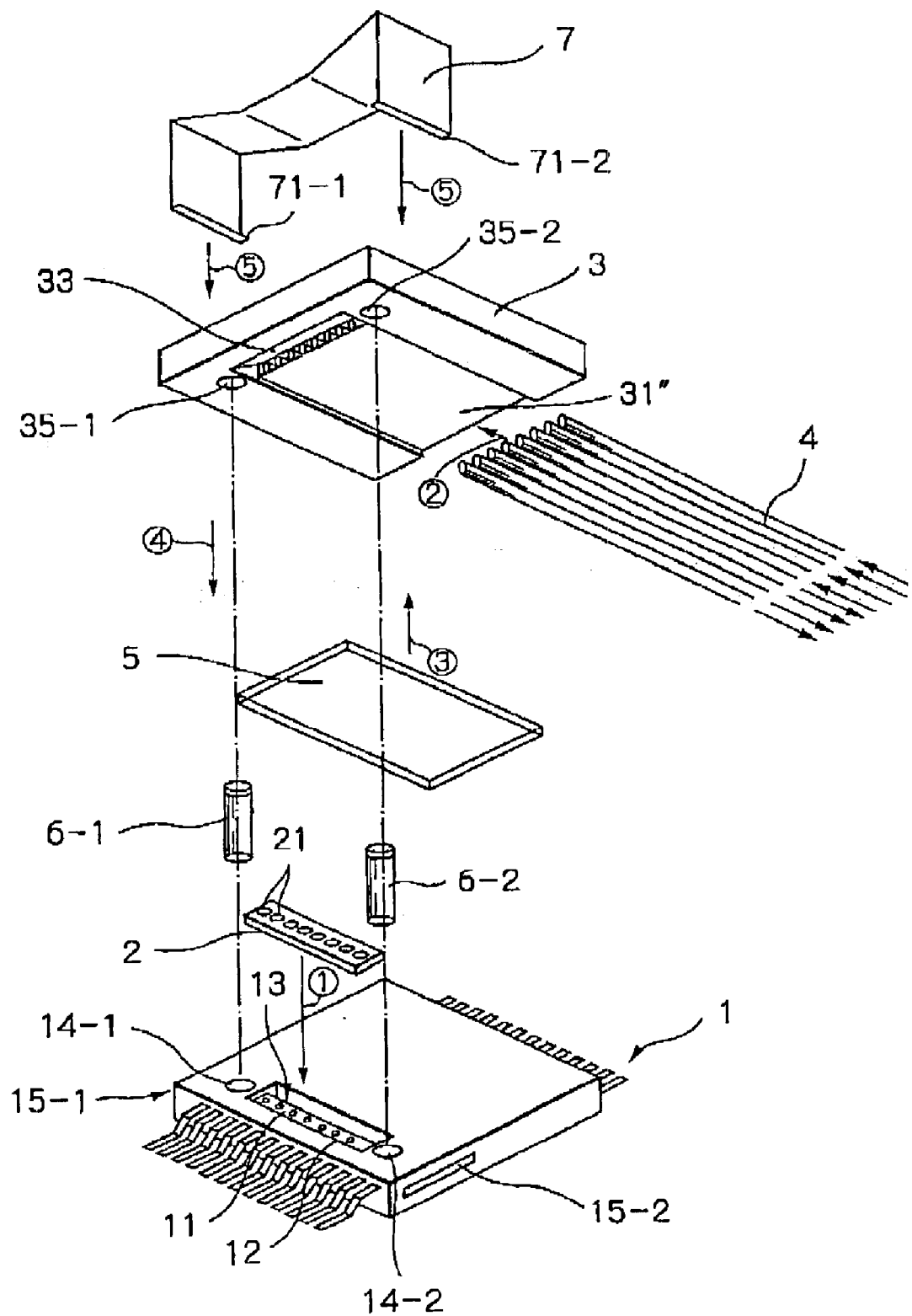
FIG. 10 is an exploded, perspective view illustrating a third embodiment of the optical module according to the present invention.

In FIG. 10, which illustrates a third embodiment of the optical module according to the present invention, a capillary 31" is provided instead of the V-shaped grooves 31 of FIG. 4, Assembling and disassembling operation of the optical module of FIG. 10 can be carried out in a similar way as in the optical module of FIG. 4. Also, the modifications of FIGS. 7 and 8 can be applied to the optical module of FIG. 10.

In the above-described embodiments, the package 1 is manufactured by a transfer molding process using resin, so that the guide holes 14-1 and 14-2 (the balls 14'-1 and 14'-2 the protrusions 14"-1 and 14"-2) and the recesses 15-1 and 15-2 can be simultaneously formed. On the other hand, the fiber array connector 3 (optical array connector 3') is manufactured by a transfer molding processing resin, so that the V-shaped grooves 31, vertical stopper face 32, the oblique face 33 and the vertical stopper face 33, the guide recesses 35-1 and 35-2 (the recesses 35'-1, 35'-2, 35"-1 and 35"-2) can be simultaneously formed, As explained hereinabove, according to the present invention, since the alignment of an optical array connector (fiber array connector) to a package does not fluctuate, the coupling efficiency can be improved. Also, since the optical array connector is completely removable from the package, the fluctuation of the coupling loss can be suppressed.

What is claimed is:

1. An optical module comprising:
   a package including an array of first optical elements and at least one first positioning member;
   a microlens array plate including microlenses, fixed to said package, so that each of said microlenses corresponds to one of said first optical elements;
   an optical array connector for mounting second optical elements thereon, said optical array connector having a light path bending portion for light paths of said second optical elements and at least one second positioning member, said optical array connector abutting against said package by aligning said second positioning member to said first positioning member so that each of said first optical elements corresponds to one of said second optical elements; and
   a clamping member for clamping said optical array connector to said package.

2. The optical module as set forth in claim 1, wherein each of said first optical elements comprises one of a surface-light-emitting element and a surface-light-receiving element.

3. The optical module as set forth in claim 1, wherein said optical array connector comprises:
   a plurality of groove portions each for mounting one of said second optical elements; and
   an oblique face, adjacent to said groove portions, for mounting said light path bending portion.

4. The optical module as set forth in claim 3, wherein said light path bending portion comprises a mirror.

5. The optical module as set forth in claim 3, wherein a transparent resin layer is fitted into a space between said oblique face and said second optical elements.

6. The optical module as set forth in claim 3, further comprising a transparent plate adhered to said second optical elements, so that said second optical elements are sandwiched by said groove portions and said transparent plate.

7. The optical module as set forth in claim 3, wherein said second optical elements comprise optical fibers.

8. The optical module as set forth in claim 1, wherein said optical array connector comprises;
   a recess portion for mounting said second optical elements; and
   an oblique face, adjacent to said recess portion, for mounting said light path bending portion.

9. The optical module[]as set forth in claim 8, wherein said light path bending portion comprises a mirror.

10. The optical module as set forth in claim 9, wherein a transparent resin layer is fitted into a space between said oblique face and said second optical elements.

11. The optical module as set forth in claim 8, further comprising a transparent plate adhered to said second optical elements, so that said second optical elements are sandwiched by said groove portions and said transparent plate.

12. The optical module as set forth in claim 8, wherein said second optical elements comprise optical waveguides forming an optical waveguide array.

13. The optical module as set forth in claim 1, wherein said optical array connector comprises:
   a recess portion for mounting a capillary of said second optical elements; and
   an oblique face, adjacent to said recess portion, for mounting said light path bending portion.

14. The optical module as set forth in claim 13, wherein said light path bending portion comprises a mirror.

15. The optical module as set forth in claim 13, wherein a transparent resin layer is fitted into a space between said oblique face and said second optical elements.

16. The optical module as set forth in claim 13, further comprising a transparent plate adhered to said second optical elements, so that said second optical elements are sandwiched by said groove portions and said transparent plate.

17. The optical module as set forth in claim 13, wherein said second optical elements comprise optical fibers.

18. The optical module as set forth in claim 1, wherein said first positioning member comprises a recess portion formed in said package and said second positioning member comprises a recess portion formed on said optical array connector,
   said optical module further comprising at least one guide pin fitted into the recess portions of said first and second positioning members.

19. The optical module as set forth in claim 1, wherein said first positioning member comprises a ball adhered to said package and said second positioning member comprises a recess portion formed in said optical array connector,
   the ball of said package being fitted into the recess portion of said optical array connector.

20. The optical module as set forth in claim 1, wherein said first positioning member comprises a recess portion formed in said package and said second positioning member comprises a ball adhered to said optical array connector,
   the ball of said optical array connector being fitted into the recess portion of said package.

21. The optical module as set forth in claim 1, wherein said first positioning member comprises a protrusion formed on said package and said second positioning member comprises a recess portion formed in said optical array connector,
   the protrusion of said package being fitted into the recess portion of said optical array connector.

22. The optical module as set forth in claim 1, wherein said first positioning member comprises a recess portion formed in said package and said second positioning member comprises a protrusion formed on said optical array connector,
   the protrusion of said optical array connector being fitted into the recess portion of said package.

23. The optical module as set forth in claim 1, wherein said clamping member comprises an adiabatic material and has two nails for grasping said package.

24. An optical module comprising;
   a package including an array of surface-light-emitting elements and surface-light-receiving elements and at least one first positioning member;
   a microlens array plate including microlenses, fixed to said package, so that each of said microlenses corresponds to one of said surface-light emitting elements and said surface-light-receiving elements;
   an optical array connector for mounting optical fibers thereon, said optical array connector having a light path bending portion for bending light paths of said optical fibers and at least one second positioning member, said optical array connector abutting against said package by aligning said second positioning member to said first positioning member so that each of said surface-light-emitting elements and said surface-light-receiving elements corresponds to one of said optical fibers; and
   a clamping member for clamping said package and said optical array connector.

25. An optical module comprising:
   a package including an array of surface-light-emitting elements and surface-light-receiving elements and at least one first positioning member;
   a microlens array plate including microlenses, fixed to said package, so that each of said microlenses corresponds to one of said surface-light emitting elements and said surface-light-receiving elements;
   an optical array connector for mounting an optical waveguide array thereon, said optical array connector having a light-path bending portion for bending light paths of said optical waveguide array and at least one second positioning member, said optical array connector abutting against said package by aligning said second positioning member to said first positioning member so that each of said surface-light-emitting elements and said surface-light-receiving elements corresponds to one waveguide of said optical waveguide array; and
   a clamping member for clamping said package and said optical array connector.

26. An optical module comprising:
   a package including an array of surface-light-emitting elements and surface-light-receiving elements and at least one first positioning member;
   a microlens array plate including microlenses, fixed to said package, so that each of said microlenses corresponds to one of said surface-light emitting elements and said surface-light-receiving elements;
   an optical array connector for mounting a capillary for optical fibers thereon, said optical array connector having a light path bending portion for bending light paths of said optical fibers and at least one second positioning member, said optical array connector abutting against said package by aligning said second positioning member to said first positioning member so that each of said surface-light-emitting elements and said surface-light-receiving elements corresponds to one of said optical fibers; and a clamping member for clamping said package and said optical array connector.

27. A method for manufacturing an optical module, comprising the steps of:

fixing a microlens array plate including microlenses to a package including an array of optical element and at least one first positioning member, so that each of said microlenses corresponds to one of said optical elements;

mounting optical fibers in groove portion of an optical array connector having a light path bending portion for bending light paths of said optical fibers;

adhering a transparent plate to said optical array connector so that said optical fibers are sandwiched by said transparent plate and said optical array connector;

abutting said optical array connector against said package by aligning said second positioning member to said first positioning member; and clamping said optical array connector to said package.

28. A method for manufacturing an optical module, comprising the steps of:

fixing a microlens array plate including microlenses to a package including an array of optical elements and at least one first positioning member, so that each of said microlenses corresponds to one of said optical elements;

mounting an optical waveguide array in an optical array connector having a light path bending portion for bending light paths of said optical waveguide array;

adhering a transparent plate to said optical array connector so that said optical waveguide array is sandwiched by said transparent plate and said optical array connector;

abutting said optical array connector against said package by aligning said second positioning member to said first positioning member; and clamping said optical array connector to said package.

29. A method for manufacturing an optical module, comprising the steps of:

fixing a microlens array plate including microlenses to a package including an array of optical element and at least one first positioning member, so that each of said microlenses corresponds to one of said optical elements;

mounting a capillary for optical fibers in an optical array connector having a light path bending portion for bending light paths of said optical fibers;

adhering a transparent plate to said optical array connector so that said capillary is sandwiched by said transparent plate and said optical array connector;

abutting said optical array connector against said package by aligning said second positioning member to said first positioning member; and clamping said optical array connector to said package.

* * * * *